United States Patent Office  
2,841,622  
Patented July 1, 1958

2,841,622

PROCESS FOR PRODUCING ALKYLATED PHENOLS

Douglas G. Norton, Berkeley, and Frank C. Davis, Richmond, Calif., assignors to Shell Development Company, New York, N. Y., a corporation of Delaware No Drawing. Application May 8, 1957  
Serial No. 657,714

14 Claims. (Cl. 260—624)

This invention relates to a process for preparation of 2,4,6-trialkyl phenols. More particularly, it relates to a novel process for cleaving certain bisphenols resulting in products of the type described.

It is known that various alkylated phenols are useful as anti-oxidants and many such compounds and methods for preparing them have been described. Other phenolic compounds have, from time to time, been reported to exhibit antioxidant properties such as certain biphenols and bisphenols. Recently, there have become available methods for the preparation of bisphenols having the formula

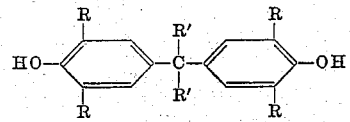

wherein each R is an alkyl group and each R' is selected from hydrogen and lower alkyl. It has now been found that bisphenols of the type described above may be so treated whereby they are cleaved to produce high yields of useful products. It will further appear hereinafter that by a proper selection of reactants the methods of this invention provide a substantially homogeneous product, i. e. one which is substantially free of mixed reaction products.

It is an object of this invention to provide novel processes for the cleaving of certain bisphenols. It is another object of this invention to provide a novel process for cleaving certain bisphenols whereby a substantially homogeneous product is obtained. It is yet another object of this invention to provide a novel process for the preparation of para-alkyl-2,6-dialkyl phenols using certain bisphenols as starting materials. It is yet another object of this invention to provide novel and useful processes for reacting certain bisphenols to produce polyalkyl phenols which are useful as anti-oxidants. Other objects will become apparent as the description proceeds.

These and other objects are accomplished by the process which comprises reacting a bisphenol of the formula

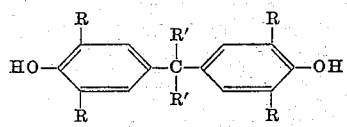

wherein each R is an alkyl group and each R' is selected from the group consisting of hydrogen and lower alkyl, said reaction being conducted in the presence of an alcohol and a base at temperatures ranging from about 150 C. to below temperatures at which substantial decomposition occurs.

Because the process of this invention is conducted at elevated temperature, it is necessary to use elevated pressures and accordingly the reaction may be conducted in any suitable pressure vessel. The process merely requires that the reactants and reagents be charged to the reaction vessel and heat be applied to the desired reaction temperature. Because the process of this invention is conducted so easily and simply, continuous, intermittent or batch operations may be employed. After the reaction is complete the reaction product is removed from the reaction vessel and the desired product is separated by any conventional means.

The alcohol, which is required for the process of this invention, serves two purposes. On the one hand it is a solvent but, more importantly, it is a principal reactant and participates in the reaction to the extent that it will largely determine the nature and yield of the final product. Before considering possible reaction mechanisms which are involved, it is desirable to consider the alcohol and its role in more detail. It may be stated that the final product will be substantially homogeneous only when the alcohol is of the same configuration and has the same number of carbon atoms as in the methylene bridge joining the phenolic radicals. If such a relationship does not exist then mixed reaction products will be obtained. This may be represented by the following equations wherein R is alkyl:

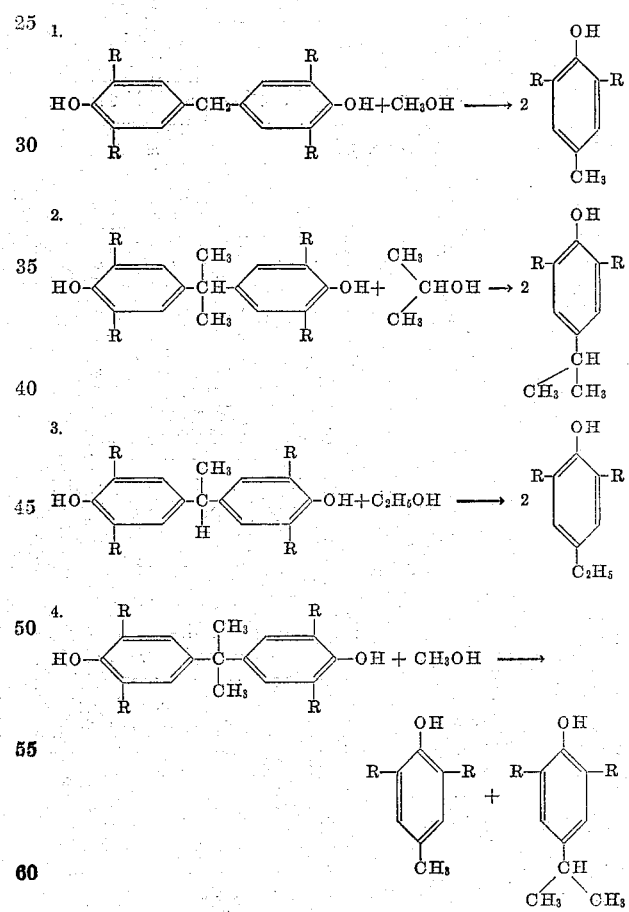

The foregoing formulae are merely representative as it will be found that alcohols, as a class, can participate in the reaction. The process of this invention is most suitably conducted when the alcohol contains up to 6 carbon atoms. Such alcohols include methanol, ethanol, propanol, isobutanol, hexanol and the like. In the preferred embodiment alcohols having 1 to 3 carbon atoms are employed as such alcohols react most readily. Methanol is particularly preferred because it reacts most easily, produces the highest yields, and results in products which are known to have the greatest utility as antioxidants.

The mechanisms which are involved in the present invention are not known for certain. As it may be helpful for a better understanding of the scope of the invention, a possible mechanism is suggested but it should be understood that the invention is in no way limited by theoretical considerations as the invention is fully operable irrespective of the mechanisms which are involved.

It is believed that the bisphenol reacts under the conditions stated to produce one mole of an unstable intermediate having the formula

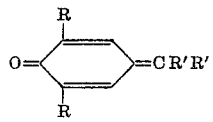

which may be generically termed a "quinone methide." The quinone methide is then believed to undergo reduction to produce the para-alkylated product. The reducing medium may possibly be afforded by either the alcohol or from a reaction which may take place between the alcohol and the base. In addition to the quinone methide, it is likely that one mole of the corresponding 2,6-dialkyl phenol is also produced. The 2,6-dialkyl phenol may then possibly react with the reaction product of the alcohol and base. When the methylene bridge and the alcohol have the same configuration as described above, two moles of reaction product are produced from each mole of the bisphenol. On the other hand, if the configuration of the methylene bridge and the alcohol are not the same, one mole of product is obtained from the quinone methide and a second mole of a different product is obtained from the reaction of the 2,6-dialkyl phenol and the reaction product of the alcohol and base.

Evidence that the alcohol participates in the reaction is amply indicated by the finding that alcohol is consumed in the course of the reaction. It is also found that the base is an essential ingredient for the process of this invention. If the quantity of the base is lowered the yield will be lower and if it is not present then the above-described reactions will not take place.

The process of this invention requires that a reducing medium be present during the course of the reaction. As previously indicated, such a medium may be afforded by the presence of the alcohol and the base. It will be found that other reductants may be present during the course of the reaction. Thus, if desired, such reducing agents as hydroquinone, hydrosulfite and the like may be added. Similarly, the reaction may be conducted in the presence of hydrogen and a hydrogenation catalyst. The use of added reductants may reduce the reaction time slightly, possibly by lowering an induction period, but such added reductants may increase the cost without affording a commensurate reduction in the reaction time.

The quantity of the alcohol that is employed in the process will vary depending upon a number of factors. In general, it may be stated that the quantity ranges from at least a stoichiometric amount needed to provide the alkyl groups in the para-position of the final product to about 50 moles, based on the amount of the starting bisphenol. In actual practice there is needed an excess over the stoichiometric amount in order to assure maximum conversions and accordingly 10 to 50 moles of the alcohol are preferably employed with about 15 to 35 moles being particularly preferred. Among the variables which require consideration in selecting the quantity of the alcohol to be employed there may be mentioned the number of carbon atoms in the alcohol, the temperature of the reaction, the quantity of base or basic-acting material and the like, with the first being the most important. In general, greater quantities of alcohol are required with an increasing number of carbon atoms. It is a particular advantage of the present process that the alcohol serves a dual purpose, as indicated above, because any excess may be employed without incurring any substantial disadvantage except that care should be taken to avoid unnecessarily large excesses as such excesses must ultimately be separated.

The quantity of the base which is employed will likewise vary depending upon several factors, such as the nature of the alcohol employed in the process, the temperature at which the reaction is conducted, and the strength of the base. In general, it may be stated that the quantity of the base which is employed will range from .05 to 15 moles per mole of the starting bisphenol. When the alcohol is methanol and the base is a strong base, as sodium hydroxide, it will be found that .5 to 5 moles, based on the starting bisphenol, are satisfactory in most cases. When the alcohol contains from 2 to 6 carbon atoms and the base is of the strong type, the amount needed may be in the order of 10 to 15 moles. In those instances where a weak base is used it will be found that larger amounts may be required. The base may be employed in any desired form such as an aqueous solution, an alcoholate or it may be added to the system as a solid or liquid. If an aqueous solution is used it is advantageous that the solution be concentrated in order that the quantity of water in the system will not be excessive.

Any base or basic acting reagent is found to be suitable. Representative bases and basic acting material include hydroxides of alkali metals and alkali earth metals, ammonia and amines including primary, secondary or tertiary amines, quaternary ammonium salts, quaternary ammonium bases and the like. In addition to such bases, various oxides and carbonates of alkali earth metals and alkali metals may also be used. Such bases include calcium carbonate, sodium carbonate, calcium oxide, potassium carbonate and the like. In the preferred embodiment of this invention the base is most advantageously selected from those that may be characterized as the strong type, particularly the hydroxides of alkali metals and tertiary amines. If an organic base is to be used, the greatest advantage is obtained from such bases which are of low molecular weight as triethyl amine, trimethyl amine, tetramethylene diamine, and the like, as such materials will participate in the reaction more readily.

The process of this invention is found to be operable only when the positions indicated by the R's are occupied. It is further found that the R's may be any alkyl radical. While this invention is in no way dependent upon theoretical considerations, it is believed that when the bisphenol is substituted in the positions indicated by R steric hinderance somehow operates to effect cleavage under the conditions indicated. Accordingly, the R's may be such radicals as methyl, ethyl, propyl, isopropyl, sec-butyl, 1-methylene pentyl, tert-butyl, 2-methyl hexyl, and the like. It is further found that the processes of this invention proceeds most rapidly with higher yields as the degree of hinderance increases. Therefore, in the preferred embodiments of this invention the R's are selected from secondary or tertiary alkyl radicals of he type described above with the latter being most preferred.

The R's in the above formulae may be hydrogen or lower alkyl but it should be noted that when the R's are other than hydrogen, lower yields are obtained. Accordingly, the R's may be the same or different and are selected from hydrogen or lower alkyl such as methyl, ethyl, propyl and the like. With these considerations understood, it may be stated that the final products will contain in the 2- and 6-positions the alkyl radicals which are contined in the 2,2'6,6'-positions of the starting bisphenol.

The temperature at which the reaction is conducted ranges from above about 150° C. to below a temperature at which substantial decomposition occurs. In the preferred embodiment temperatures ranging from about 200° C. to about 250° C. are employed because such a temperature range affords the greatest yields in most instances. In general, temperatures in excess of about 350° C. should be avoided because dealkylation will occur in the 2- and 6-positions resulting in a complex mixture of reaction products. Further, temperatures in the order of 300° C. or higher are usually unnecessary.

The process of this invention also employs elevated pressures which may be made dependent on the temperature. In the preferred embodiment the pressure which is employed is the pressure created by the system, i. e. autogenous pressures. If desired higher pressures may be employed as the pressure is not an important consideration in the processes of this invention.

The time required for the reaction to be completed will depend upon the nature of the several variables described above, but in general it will range from one to four hours. In the most preferred embodiments of reactants and conditions of reaction it will be found that the reaction is substantially complete in about two hours or less.

The process of this invention may, in some instances, be advantageously conducted in the presence of a hydrogenation-dehydrogenation catalyst. Such catalysts are found to hasten the reaction but the degree to which the reaction is speeded up is not always very great and the cost of the catalyst and the additional effort required to separate it from the reaction product may offset any advantage obtained in decreasing the reaction time. However, a hydrogenation-dehydrogenation catalyst may be advantageously utilized where it is desired to conduct the reaction at temperatures in the order of 300° C. or higher as dealkylation will be somewhat minimized. However, as indicated above, operation at temperatures above 300° C. is, in most instances, unnecessary. Among the suitable hydrogenation-dehydrogenation catalysts there may be mentioned copper, cadmium, silver, vanadium salts or oxides, iron-molybdenum oxides, tungsten-molybdenum oxides, and the like.

After the reaction is complete, the reaction product is separated by any conventional means such as by extraction with inert solvents such as benzene, toluene, xylene, n-pentane, isooctane, dimethyl ether and the like. The alcohol is recovered for reuse in subsequent batches.

The process of this invention will be described in greater detail in the following examples which are intended for purposes of illustration only and are not regarded as limitations to the appended claims.

*Example I*

A mixture of 0.1 mole, 42.4 g, of 4,4'-methylene bis(2,6-di-tert-butyl phenol), 0.3 mole, 16.2 g. of sodium methoxide and 200 milliliters of methanol is heated and shaken in a sealed steel vessel. The vessel and its contents are heated at 200° C. for about 4 hours at autogenic pressure. The total pressure at the end of the reaction is 550 p. s. i. g. After 4 hours, the reaction product is removed from the vessel, washed with water and extracted with diethyl ether. The ether is evaporated to yield 43 grams of residue of which 35 grams is substantially pure 2,6-di-tert-butyl para-cresol, B. P. 105–7° C (3 mm. Hg), M. P. 69–70° C. The remainder comprises unreacted bisphenol and an unidentified material.

*Example II*

The procedure of Example I was repeated except that the reaction is conducted for about 2 hours using sodium hydroxide. Substantially the same results are obtained.

*Example III*

The procedure of Example I is repeated except that 180 ml. of isopropyl alcohol is used in place of the methanol. The vessel is sealed and heated to about 200° C. and maintained at that temperature for 2 hours. Thereafter the reaction product is treated as in Example I to recover about equal parts, by weight, of 2,6-di-tert-butyl p-cresol and 2,6-di-tert-butyl-4-isopropyl phenol. There is also recovered unreacted starting material and an unidentified residue.

*Example IV*

The procedure of Example I is repeated except that the bisphenol is replaced with a molar equivalent of 2,2-bis(1-hydroxy-2,6-di-tert-butyl)propane. After working up there is obtained a mixture of substantially pure 2,6-di-tert-butyl para-cresol and 2,6-di-tert-butyl-4-isopropyl phenol.

*Example V*

In two separate experiments the procedure of Example I is repeated except that the corresponding 2,6-diisopropyl derivative of the bisphenol is used. The reaction is conducted first at 200° C. then at 225° C. In both instances 2,6-diisopropyl para-cresol is obtained. It will be found that higher yields are obtained at 225° C.

*Example VI*

The procedure of Example V is repeated using pentanol and temperatures of 250° C. There is obtained a mixture of 2,6-diisopropyl para-pentyl phenol, and 2,6-diisopropyl-para-cresol.

*Example VII*

The procedure of Example I is repeated in three separate experiments using potassium carbonate, ethylene diamine and tetramethyl ammonium hydroxide, respectively, instead of sodium methoxide. The same product is obtained in lower yields.

*Example VIII*

The procedure of Example I is repeated using the corresponding 2,6-dimethyl bisphenol and a temperature of 265° C. There is obtained 2,4,6-trimethyl phenol in about 71% yield, based on the bisphenol. Using isopropyl alcohol instead of methanol there is obtained a mixture of 2,6-dimethyl-para-isopropyl phenol and 2,4,6-trimethyl phenol in a somewhat lower yield.

From the foregoing description it will be seen that this invention is capable of numerous modifications. One modification comprises the use of solvents, other than a lower alcohol. Such a modification may be beneficially employed when the alcohol is a higher alcohol such as n-octyl alcohol, lauryl alcohol and the like. By this means the 2,6-dialkyl phenol will be alkylated in the para-position with higher alkyl radicals.

Still other modifications may be employed without departing from the spirit of the invention.

We claim as our invention:

1. In the process for preparing 2,4,6-trialkyl phenols, the improvement which comprises reacting a bisphenol of the formula

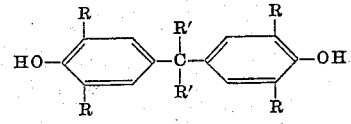

wherein the R's are alkyl and the R¹'s are selected from the group consisting of hydrogen and lower alkyl, said reaction being conducted in the presence of an aliphatic alcohol and a base at temperatures from about 150° C. to about 350° C. and at pressures sufficient to maintain the reactants in liquid form.

2. The process of claim 1 in which the base is an alkali metal hydroxide.

3. The process of claim 1 in which the alcohol is methanol.

4. The process of claim 1 in which the alcohol is ethanol.

5. The process of claim 1 in which the alcohol is isopropyl alcohol.

6. The process of claim 1 in which the reaction is conducted at a temperature from about 200° C. to about 300° C.

7. In the process for preparing 2,4,6-trialkyl phenols, the improvement which comprises reacting a bisphenol of the formula

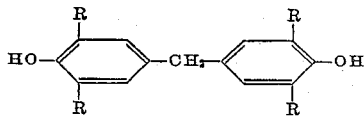

wherein the R's are alkyl, said reaction being conducted in the presence of an aliphatic alcohol and a base at temperatures from about 150° C. to about 350° C. and at pressures sufficient to maintain the reactants in liquid form.

8. The process of claim 7 in which the alcohol is methanol.

9. The process of claim 7 in which the base is an alkali metal hydroxide.

10. The process which comprises reacting 4,4'-methylene bis(2,6-dialkyl phenol) with methanol in the presence of a base, said reaction being conducted at temperatures ranging from about 150° C. to about 300° C., the alcohol being present in molar excess of the bisphenol, thereafter separating the product 2,6-dialkyl para-cresol.

11. The process of claim 10 in which the reaction is conducted at temperatures ranging from about 200° C. to about 250° C.

12. The process of claim 10 in which the alcohol is present from about 10 to 50 moles, based on the bisphenol.

13. The process of claim 10 in which the base is an alkali metal hydroxide.

14. The process of claim 10 in which the bisphenol is methylene bis(2,6-di-tert-butyl) phenol and the final product is 2,6-di-tert-butyl para-cresol.

References Cited in the file of this patent

UNITED STATES PATENTS

| | | |
|---|---|---|
| 1,848,665 | Schoeller et al. | Mar. 8, 1932 |
| 2,497,503 | Jones | Feb. 14, 1950 |